United States Patent Office 3,846,239
Patented Nov. 5, 1974

3,846,239
PROCESS FOR THE PREPARATION OF HEAT-RESISTANT α-GALACTOSIDASE ENZYME
Jacques J. Delente, University City, and Richard J. O'Connor and Mau-Jung Kuo, Creve Coeur, Mo., assignors to Monsanto Company, St. Louis, Mo.
No Drawing. Filed July 24, 1972, Ser. No. 274,523
Int. Cl. C07g 7/02
U.S. Cl. 195—66 R                8 Claims

ABSTRACT OF THE DISCLOSURE

The production of heat-resistant α-galactosidase enzyme having optimum activity at neutral pH is accomplished by cultivating a strain of *Bacillus stearothermophilus* (strain SBFT) in an aqueous nutrient fermentation medium. The enzyme is useful in the hydrolysis of α-galactosides such as stachyose and raffinose.

BACKGROUND OF THE INVENTION

Field of the Invention

This invention relates to a process for the preparation of α-galactosidase enzyme. In a particular aspect, this invention relates to a process for the preparation of heat resistant α-galactosidase enzyme which has optimum activity at neutral pH by fermentation with a strain of *Bacillus stearothermophilus*.

Description of the Prior Art

The enzyme α-galactosidase is of interest since many carbohydrates cannot be utilized by animals because of the unavailability in the animal system of α-galactosidase which is required to split the appropriate linkage of the carbohydrate for transformation into utilizable moieties. For example, at least four carbohydrate components of soybean meal cannot be nutritionally utilized by animals because of the unavailability in the animal body of this enzyme or another capable of performing the same function. The enzyme is accordingly of interest as a feed supplement or a feed supplement component for the purposes of increasing the energy value of such carbohydrate-containing composition, allowing the more effective use of soybeans in animal nutrition, elimination or reduction of flatulence in the lower intestines because of bacterial fermentation of undigested carbohydrates such as stachyose and raffinose and improvement of taste of soybean material and similar products by the splitting of polysaccharides present therein. α-Galactosidase enzyme is also useful in treatments of soy milk and raffinose containing beet sugar streams.

The production of α-galactosidase enzyme by fermentation with certain micro-organisms is well known to the art. For example, strains of *Aspergillus niger*, of *Saccharomyces carlsbergensis*, of *Escherichia, coli* and *Aerobacter aerogenes* are known to produce enzyme having α-galactosidase activity. The enzyme from these sources suffer either from low thermostability (rapid loss of activity at about 40° C.) or from low activity at neutral pH. In the treatment of soy milk in puarticular enzyme which is most active at neutral pH preferred since an acidic pH tends to clot the soy milk. α-Galactosidase which has optimum activity at neutral pH is also preferred for use in beet sugar stream treatments to avoid unwanted hydrolysis of sugars other than raffiose. Of course, thermostability is preferred for all applications irrespective of optimum pH activity.

SUMMARY OF THE INVENTION

It has been discovered in accordance with the present invention that α-galactosidase enzyme which has optimum activity at neutral pH and which retains substantial activity at temperatures above 38° C. for extended periods of time (e.g. 24 hours or more), is obtained by cultivating in an aqueous nutrient fermentation medium the micro-organism *Bacillus stearothermophilus* strain (SBFT). A culture of this micro-organism was deposited in the culture collection of Northern Utilization Research and Development Division, Agricultural Research Service, United States Department of Agriculture, Peoria, Ill. on Jan. 26, 1972 and was assigned the culture collection number NRRL-B-5407.

DETAILED DESCRIPTION

Characteristics of *Bacillus stearothermophilus* strain NRRL-B-5407 are given in Table I.

The process of the present invention for the production of heat resistant α-galactosidase enzyme comprises formenting a culture of the organism *Bacillus stearothermophilus* (strain NRRL-B-5407) in an aqueous nutrient fermentation medium containing assimilable source(s) of nitrogen, carbon and nutrient minerals. Fermentation conditions may be of the surface or of the submerged type. The fermentation may be carried out over a relatively broad pH range with the preferred pH being in the range of from about 6.0 to about 8.0. The fermentation is typically carried out at a temperature in the range of from about 35 to about 65° C. with a temperature in the range of from about 45 to 55° C. being preferred. The fermentation medium is preferably maintained within the preferred pH and temperature ranges during the entire fermentation, which is ordinarily completed in a matter of from about 8 to about 36 hours when conducted under aeration-agitation or shaking conditions. It is also preferred during the fermentation that the oxygen level in the medium be maintained at not less than about 10% of saturation concentration.

Assimilable sources of carbon which are suitable for use in the fermentation medium include carbohydrate sources such as raffinose, soybean meal or other legume bean meal, melibiose, stachyose and the like. The nitrogen source may be for examples, tryptone, peptone, soybean meal, or other legume bean meal, nutrient broth yeast extract and the like. Mineral salts such as magnesium sulfate, calcium chloride, ferrous sulfate, potassium orthophosphate and the like are used with desired results. Optionally, an α-galactoside inducer can be added to the nutrient medium. The preferred inducer is raffinose since it also serves as a source of carbon. Other α-galactoside inducers suitable for use in the process of the present invention are substituted α-galactosides, such as p-nitrophenyl-α-D-galactopyranoside; and sugars, such as stachyose, melibose or the like.

TABLE I

Characteristics

| | |
|---|---|
| Motility | Positive. |
| $H_2S$ production | Negative. |
| Urease | Negative. |
| Gelatin Hydrolysis | Positive. |
| Growth in Litmus Milk | Acid; slow coagulation. |
| Maltose Fermentation | Positive. |
| Sucrose Fermentation | Positive. |
| Lactose Fermentation | Positive. |
| Dextrose Fermentation | Positive. |
| Raffinose Fermentation | Positive. |
| Indole Production | Negative. |
| Citrate Utilization | Negative. |
| Voges-Proskaur Test | Negative. |
| Growth in 7% NaCl | Negative. |
| Growth in 6.5% NaCl | Positive. |

TABLE I—Continued

| | Characteristics |
|---|---|
| Growth at 37° C. | Positive. |
| Growth at 55° C. | Positive. |
| Starch Hydrolysis | Negative. |
| Spores | Terminal to subterminal. |
| Sporangia | Definitely swollen. |
| Vegetative Cells | Rods, 0.6–1.0 by 2.0–5.0 microns; sometimes occuring in short chains. |

A significant portion of the α-galactosidase activity was found within the cells rather than in the medium. α-Galactosidase release from cells can be conveniently achieved by rupturing the cells for example by oscillation or autolysis; however, other cell rupturing methods using Waring Blender, Eppenbach colloid mill, French press, Mickle cell disintegrator, grinding with Dry Ice, sand, alumina, glass beads, or the like can be employed. Such methods are described in Hugo, W. B., *Bacteriol, Rev. 18,* 87–105 (1954).

After fermentation and release of the enzyme, the α-galactosidase preparation is filtered to remove solid material. If desired, the enzyme may then be recovered from the fermentation medium by any suitable procedure. Procedures for recovering α-galactosidase are known to the art and include the use of ion exchange resins to adsorb unwanted impurities or the enzyme and the use of organic solvents such as acetone, isopropanol and ethanol to precipitate the enzyme.

The following examples are presented for the purpose of illustration only and are not intended to be restrictive of the invention. It is to be further understood that modifications are posible in the nutrient medium in which the organism is grown and the technique of fermentation applied without departing from the spirit and scope of the invention.

In the examples, activity is expressed in units with one unit of enzyme activity being that amount of enzyme that hydrolyzes p-nitrophenyl α-D-galactopyranoside at 25° C. at the rate of 1 micromole per minute.

EXAMPLE 1

The growth of a culture of *Bacillus stearothermophilus* NRRL–B–5407 from an 18 × 150 mm. slant having the following composition: 1.0% raffinose, 0.5% peptone, 0.2% ammonium sulfate, 0.3% dihydrogen potassium orthophosphate, 0.7 monohydrogen potassium orthophosphate, 0.02% magnesium sulfate, 2.0% agar (pH 7.0) was transfered to a 500 ml. four-baffle Erlenmeyer shake flask containing 50 ml. of nutrient medium having the following composition: 0.1 M potassium phosphate, 1.6% raffinose, 0.8% peptone, 0.2% yeast extract (pH 7.5). The innoculated medium was incubated at 55° C. for 11 hours on a rotary shaker (200 r.p.m., 1 in. diameter eccentricity). On completion of the incubation period 5 ml. of the 11 hour culture was added to a 500 ml. four-baffle Erlenmeyer shake flask containing 100 ml. of nutrient medium having the following composition: 0.1 M potassium phosphate, 8.0% raffinose, 2.0% nutrient broth, 2.0% yeast extracts, 0.01% magnesium sulfate, 0.02% calcium chloride, 0.003% ferrous sulfate heptahydride (pH 7.5). The innoculated medium was incubated at 55° C. on a rotary shaker (200 r.p.m., 1 in. diameter eccentricity). After 11 hours the total fermentation medium (cells plus beer) was found to contain 0.15 unit per ml. of α-galactosidase enzyme with approximately 90% of the α-galactosidase activity being within the cells.

EXAMPLE 2

Fermentation medium (8 liters) of the same composition as the 100 ml. medium employed in Example 1 was charged to a 14 liter fermentor. The medium was inoculated with an inoculum culture of *Bacillus stearothermophilus* (NRRL–B–5407) (500 ml.) which was prepared in the same manner as the 5 ml. culture of Example 1. The fermentation was then conducted at 55° C. with agitation (400 r.p.m.) and with aeration (0.8 volumes of air per volume of medium per minute). After 10 hours of fermentation, the medium (beer) was found to contain 0.02 unit/ml. of α- galactosidase activity.

EXAMPLE 3

The procedure of Example 2 was repeated in all essential details. On completion of the 10-hour fermentation period the fermentation medium (beer) was found to contain 0.017 unit/ml. of α-galactosidase activity.

The total fermentation media of Examples 2 and 3 were combined. The combination was then cooled to 4° C. and maintained at that temperature for 6 weeks. On completion of the six week cooling period, the combination of medium was assayed and found to contain 0.09 unit/ml. of α-galactosidase activity. The increase in activity was believed due to release of enzyme from the cells caused by autolysis.

EXAMPLE 4

The fermentation procedure of Example 2 was repeated in all essential details with the exception that the fermentation was conducted for 12.5 hours instead of 10 hours. The total fermentation medium contained 0.062 unit/ml. of α-galactosidase activity.

The fermentation medium was centrifuged (8000× gravity for 30 minutes) to remove solids and the supernatant was retained. The supernatant contained about 81% of the total enzymatic activity. Isopropanol (vol./vol.) was then added to the retained supernatant and a precipitate was obtained. The precipitate was dried to give a powder having α-galactosidase activity of 2.5 units/gram. The α-galactosidase enzyme had optimum activity at pH 6–7. On storage for 42 hours at 45° C., the enzyme preparation was found to lose less than 50% of its original activity.

EXAMPLE 5

Fermentation

To each of two 500 ml. 4-baffle shake flasks, each flask containing 100 ml. of nutrient inoculum medium of the following composition: M/15 potassium phosphate, 1.0% raffinose, 1.0% tryptone, 0.5% yeast extract (pH 7.0), was added slant growth of a culture of *Bacillus stearothermophilus* NRRL–B–5407. The medium was incubated on a rotary shaker (200 r.p.m.) at 50° C. for 7.5 hours. On completion of the 7.5 hour incubation period the contents of the two flasks were added to a 30 liter fermentor containing 12 liters of nutrient medium of the same composition as the above-described inoculum medium. The 12 liter fermentation medium was then agitated (400 r.p.m.) and aerated with 1 vol./vol. minutes of air for 3 hours at 50° C. The medium was then added to a fermentor containing 110 liters of sterile nutrient medium prepared as follows for one liter of medium: Soybean meal (30 grams) was washed three times with two volumes of tap water on a six layer cheese cloth filter. To the washings were added yeast extract (5 grams)

(9 grams KH$_2$PO$_4$ (3 grams) and antifoam (0.5 ml.) and the volume was adjusted to one liter wth tap water. Fermentation was conducted with agitation (400 r.p.m.) and aeration (1 vol./vol./minute of air) at 50° C. After 10 hours of fermentation the fermentation medium (cells plus beer) was found to contain 0.32 unit/ml. of α-galactosidase enzyme with about 90% of the activity being outside the cells.

Recovery

The fermentation medium containing the α-galactosidase enzyme was filtered through a filter aid to remove solid materials. The filtered beer was then mixed with Sephadex DEAE A–50–120, an anion exchange resin regenerated in the phosphate form sold by Pharmacia A. B.

Upsala, Sweden (1,080 grams) to adsorb enzyme to the resin. The enzyme was then eluted from the resin by washing with aqueous NaCl in 0.01 M phosphate buffer (pH 7.5). The eluate contained 96.6% of the original α-galactosidase activity in the fermentation medium. Isopropanol (1.5 volumes) was then added to the eluate to precipitate the α-galactosidase enzyme.

What is claimed is:

1. A process for the preparation of α-galactosidase enzyme which comprises cultivating in an aqueous nutrient fermentation medium the organism *Bacillus stearothermophilus* NRRLB–5407 and in which α-galactosidase enzyme is recovered from the fermentation medium.

2. The process of Claim 1 wherein the pH of the nutrient medium is in the range of from about 6 to about 8.

3. The process of Claim 1 wherein the cultivation temperature is in the range of from about 35 to about 65° C.

4. The process of Claim 3 wherein the temperature is in the range of from about 45 to about 55° C.

5. Heat stable α-galactosidase enzyme which has optimum activity at a pH in the range of from about 6 to about 7.

6. The process of Claim 1 in which the enzyme is recovered by organic solvent precipitation.

7. Heat stable α-galactosidase enzyme which has optimum activity at a pH in the range of from about 6 to about 7, and which is produced by fermentation utilizing a strain of *Bacillus stearothermophilus*.

8. Heat stable α-galactosidase enzyme which has optimum activity at a pH in the range of from about 6 to about 7, and which is produced by fermentation utilizing the organism *Bacillus stearothermophilus* NRRLB–5407.

References Cited
UNITED STATES PATENTS 3,647,625   7/1973   Suzuki et al. _____ 195—31

OTHER REFERENCES

Chem. Abstracts: 73: 41968 X.

Suzuki et al.: *Agr. Biol. Chem.*, Vol. 33, No. 4, pp. 506–513 (1969).

Halvorson: *Methods in Enzymology*, Vol. 8, pp. 559–562 (1966).

A. LOUIS MONACELL, Primary Examiner

T. G. WISEMAN, Assistant Examiner

U.S. Cl. X.R.

195—31 R, 62